US010399883B2

(12) United States Patent
Berkey et al.

(10) Patent No.: US 10,399,883 B2
(45) Date of Patent: Sep. 3, 2019

(54) THERMALLY STABLE GLASS TUBING FORMING APPARATUSES

(71) Applicant: CORNING INCORPORATED, Corning, NY (US)

(72) Inventors: Adam Charles Berkey, Pittsburgh, PA (US); Randy Lee Rhoads, Horseheads, NY (US); Matthew Scott Weibel, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 143 days.

(21) Appl. No.: 15/402,058

(22) Filed: Jan. 9, 2017

(65) Prior Publication Data
US 2017/0203991 A1 Jul. 20, 2017

Related U.S. Application Data

(60) Provisional application No. 62/279,522, filed on Jan. 15, 2016.

(51) Int. Cl.
  *C03B 17/04* (2006.01)
  *G05D 23/19* (2006.01)
(52) U.S. Cl.
  CPC .............. *C03B 17/04* (2013.01); *G05D 23/19* (2013.01)
(58) Field of Classification Search
  CPC .................................. C03B 17/04; G05D 23/19
  See application file for complete search history.

(56) References Cited

U.S. PATENT DOCUMENTS

| 2,420,934 A * | 5/1947 | Danner ................... C03B 17/04 |
| | | 159/24.1 |
| 2,765,586 A * | 10/1956 | Wilson .................... C03B 17/04 |
| | | 373/35 |
| 3,364,004 A | 1/1968 | Cozine et al. |
| 3,717,450 A | 2/1973 | Loughridge et al. |
| 2013/0305784 A1 | 11/2013 | Gromann et al. |

FOREIGN PATENT DOCUMENTS

GB          400472 A      10/1933

OTHER PUBLICATIONS

MB Controls cut sheet on Bell Positioning System; [Online]; http://www.mbcontrolsky.com/vello-process.html.
International Search Report & Written Opinion dated Apr. 4, 2017, for PCT/US2017/012752 filed Jan. 9, 2017; pp. 1-11.

* cited by examiner

*Primary Examiner* — Queenie S Dehghan
(74) *Attorney, Agent, or Firm* — Dinsmore & Shohl LLP

(57) ABSTRACT

A bell positioning apparatus for glass tubing manufacturing includes a bell and a support connected to the bell. A bell positioning apparatus is attached to the support and configured to move the support and the bell with at least three degrees of freedom. The bell positioning apparatus includes a platform, a platform frame, and one or more frame legs. A frame leg dimensional stability apparatus maintains a temperature variation within 6.5° C. per meter of distance between each frame leg for an extended period of time, e.g. 4 hours.

24 Claims, 7 Drawing Sheets

THERMALLY STABLE GLASS TUBING FORMING APPARATUSES

CROSS REFERENCE TO RELATED APPLICATIONS

The present application claims priority to U.S. Provisional Patent Application No. 62/279,522 filed Jan. 15, 2016, and entitled, "Thermally Stable Glass Tubing Forming Apparatuses," the entirety of which is incorporated by reference herein.

BACKGROUND

Field

The embodiments described herein generally relate to apparatuses for forming glass tubing and, more specifically, to apparatuses for forming glass tubing with enhanced thermal dimensional stability.

Technical Background

Use of glass tubing to produce glass articles, such as vials, cartridges, and syringes, requires a high level of dimensional stability in the glass tubing wall. For example, vials, cartridges and syringes have tight dimensional requirements that require minimum concentricity and wall thickness variation. Industry standards require that wall thickness variations be less than 5% of the product's overall wall thickness. However, dimensional variations in the glass tubing from which the glass articles are formed may result in glass articles with wall thicknesses that are outside of acceptable tolerances. Such dimensional variations may be a result of, for example, processes instabilities or variations in the glass tubing manufacturing process.

Accordingly, a need exists for alternative glass tubing forming apparatuses which reduce dimensional variations in the glass tubing formed therefrom.

SUMMARY

The embodiments described herein relate to glass tubing forming apparatuses with enhance thermal dimensional stability that provide reduced siding loss during the production of glass tubing. Also described herein are glass tubing forming apparatuses which incorporate bell positioning apparatuses with enhanced thermal dimensional stability such that undesired movement of bells within bottom openings of glass delivery tanks due to thermal expansion and thermal contraction of the bell positioning apparatuses during glass tubing production is reduced.

According to one embodiment, a bell positioning apparatus for a glass tubing manufacturing apparatus includes a bell configured for a glass tube to be drawn over, a support connected to the bell, and a frame. The frame has a platform and a support arm, the support arm being attached to the platform and the support. The support arm is configured to move the support with three degrees of freedom. The platform is rigidly attached to the frame and the frame has a frame leg. A frame leg dimensional stability apparatus is included and maintains a temperature variation along a length of each frame leg to within 6.5 degrees centigrade per meter (°C./m) of a width of the frame leg. The frame leg dimensional stability apparatus maintains the temperature variation to within 6.5° C./m of the width of the frame leg over a 4 hour time period by uniformly heating or cooling the frame leg with a temperature control component. In embodiments, the temperature control component can be electrical resistance heating wire, heating tape, etc., wound around the length of the frame leg. Alternatively, the temperature control component may be heated or cooled air directed across the frame leg or even heated or cooled liquid in which the frame leg is immersed. In embodiments, each of the frame legs can be located within an enclosure such as an insulating blanket, liquid bath container, or the like. One or more temperature sensors can be located along the length of the frame leg and, in combination with a temperature controller and temperature control component energy source, provide energy to heat or cool the temperature control component. Heating or cooling of the temperature control component heats or cools the length of the frame leg and maintains the temperature variation to within 6.5° C./m of the width of the frame leg.

According to another embodiment, a glass tubing manufacturing apparatus includes a glass delivery tank with molten glass. The glass delivery tank has a bottom opening with an inner diameter. A bell with an upper portion having an inner diameter is located within the bottom opening of the glass delivery tank and a clearance (space) is present between the inner diameter of the glass delivery tank bottom opening and the outer diameter of the bell. A support is connected to the bell and extends up through the glass delivery tank to a bell positioning apparatus. The bell positioning apparatus includes a frame with at least one frame leg, a platform, and a support arm. The platform is attached to the frame, and the support arm is attached to the platform and the support. The bell positioning apparatus is configured to move the support arm, the support attached to the support arm, and the bell connected to the support. The bell positioning apparatus is thus configured to position the upper portion of the bell within the bottom opening of the glass delivery tank. The bell positioning apparatus also includes a frame leg dimensional stability apparatus that maintains a temperature variation along a length of each frame leg to within 6.5° C./m of a characteristic distance across the frame leg(s) along the length of the frame leg. The frame leg dimensional stability apparatus can maintain the temperature variation to within 6.5° C./m of characteristic distance across the frame leg(s) by uniformly heating or cooling the length of the frame leg with a temperature control component. In embodiments, the temperature control component can be electrical resistance heating wire, heating tape, etc., wound around the length of the frame leg. Alternatively, the temperature control component can be heated or cooled air directed across the frame leg; or heated or cooled liquid in which the frame leg is immersed in. Each of the frame legs can be located within an enclosure such as an insulating blanket, liquid bath container, and the like. One or more temperature sensors can be located along the length of the frame leg and, in combination with a temperature controller and temperature control component energy source, provide energy to heat or cool the temperature control component. Heating or cooling of the temperature control component heats or cools the length of the frame leg and maintains the temperature variation to within +/−6.5° C./m of distance between frame legs.

According to another embodiment, a method for manufacturing glass tubing includes melting a glass composition in a glass delivery tank and producing molten glass. The glass delivery tank has a bottom opening with an inner diameter. The molten glass is drawn around a bell, thereby forming glass tubing. The bell has an upper portion with an inner diameter that is located within the bottom opening of the glass delivery tank. The molten glass flows through a clearance between the inner diameter of the bottom opening and the outer diameter of the bell. The bell is positioned within the bottom opening of the glass delivery tank using a bell positioning apparatus. The bell positioning apparatus has a support arm and a frame with a platform and at least one frame leg. The support arm is attached to the platform and to a support that is connected to the bell. The bell positioning apparatus is configured to move the bell through movement of the support arm. The bell positioning apparatus includes a frame leg dimensional stability apparatus configured to maintain a temperature variation to within 6.5° C./m of distance between frame legs. In embodiments, each frame leg can be in contact with a temperature control component such as electrical resistance heating wire, heating tape, etc., wound around the length of the frame leg. Alternatively, the temperature control component may be heated or cooled air directed across the frame leg or heated or cooled liquid in which the frame leg is immersed. Each of the frame legs can be located within an enclosure such as an insulating blanket, liquid bath container, and the like. One or more temperature sensors can be located along the length of the frame leg and, in combination with a temperature controller and temperature control component energy source, provide energy to heat or cool the temperature control component. During forming and drawing glass tubing around the bell, the frame leg dimensional stability apparatus monitors the temperature along the length of each frame leg and heats or cools the temperature control component along the length of each frame leg. Heating or cooling the temperature control component heats or cools the length of the frame leg and maintains the temperature variation to within 6.5° C./m of distance between frame legs.

Additional features and advantages of the glass tubing forming apparatuses with enhanced thermal dimensional stability described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
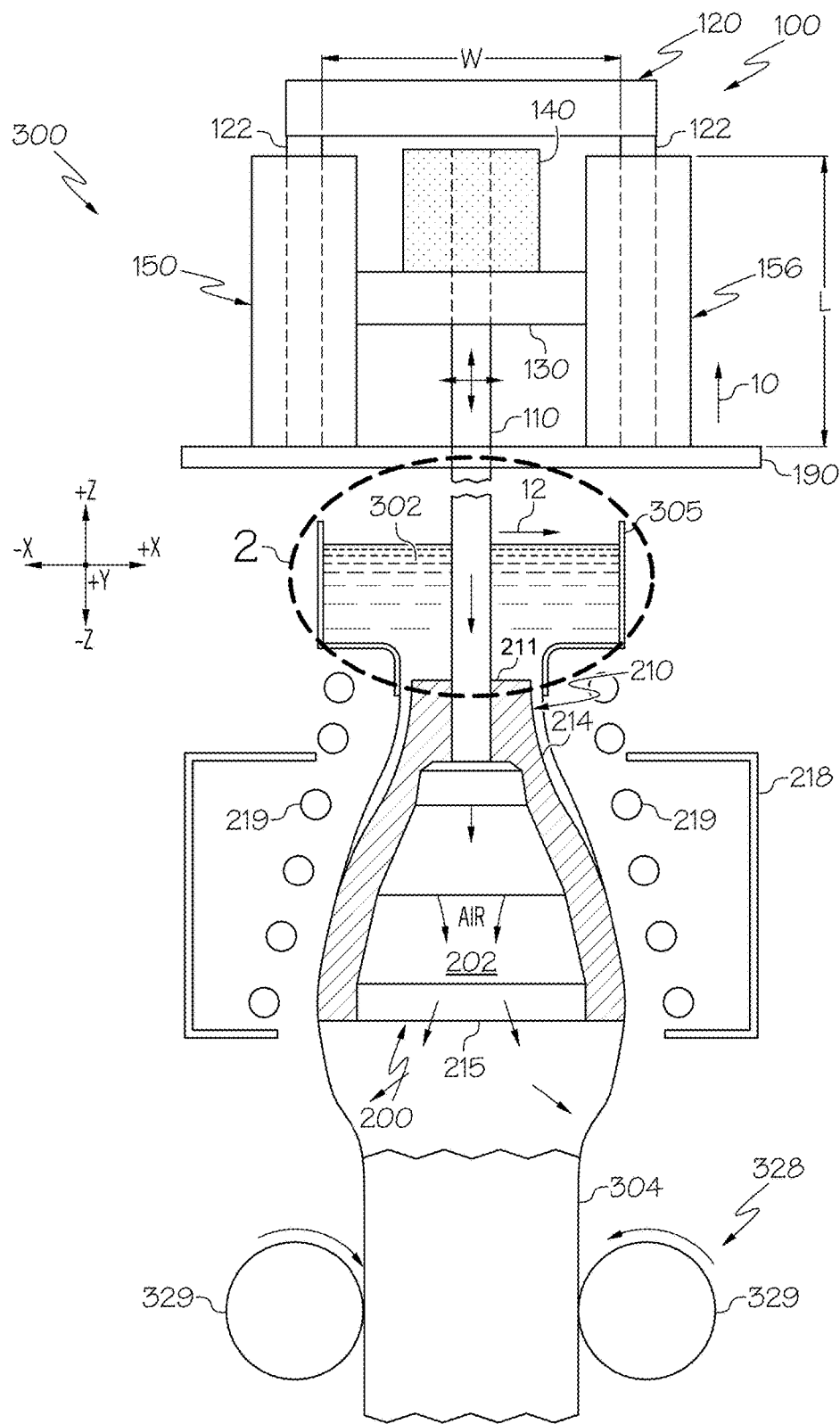
FIG. 1 is a schematic diagram of a cross section of a glass tubing manufacturing apparatus with a bell positioning apparatus according to one or more embodiments shown and described herein.

Reference will now be made in detail to various apparatuses and methods for forming glass tubing described herein, examples of which are illustrated in the accompanying drawings. Whenever possible, the same reference numerals will be used throughout the drawings to refer to the same or like parts. One embodiment of an apparatus for producing glass tubing is shown in FIG. 1. According to one embodiment, the apparatus includes a glass delivery tank with molten glass therein. The glass delivery tank has a bottom opening through which the molten glass flows. A bell is positioned at least partially within the bottom opening of the glass delivery tank. A clearance (space) is present between an outer surface of the bell and an inner surface of the bottom opening of the glass delivery tank. Glass tubing is produced by molten glass flowing through the clearance between the bell and the glass delivery tank bottom opening and being drawn over the outer surface of the bell. The bell is held within the glass delivery tank bottom opening by a support that is mechanically coupled to a bell positioning apparatus. The bell positioning apparatus can move the support, and thus the bell, with three degrees of freedom and position the bell at a desired location within the glass delivery tank bottom opening. The bell positioning apparatus has a support arm, a support arm positioning device, a platform and a frame with at least one frame leg. The support arm positioning device can be located on the platform and moves the support arm, which in turn moves the support and the bell. Each of the frame legs can be positioned within an enclosure. The enclosure contains a temperature control component positioned proximate the frame leg. In embodiments, the temperature control component can be electrical resistance heating wire, heating tape, etc., wound around the length of the frame leg. Alternatively, the temperature control component may be heated or cooled air directed across the frame leg or even heated or cooled liquid in which the frame leg is immersed. The temperature control component is maintained at a generally uniform temperature which, in turn, maintains a temperature variation between frame legs to within 6.5° C./m of distance between frame legs. Maintaining the temperature variation within 6.5° C./m of distance between frame legs provides thermal dimensional stability to the frame, platform, support arm, support, and bell. Various embodiments of bell positioning apparatuses, glass tubing manufacturing apparatuses comprising bell positioning apparatuses, and methods of use thereof, will be described in further detail herein with specific reference to the appended drawings.

One process for manufacturing glass tubing is the Vello process. The Vello process forms a glass tube by flowing molten glass around a die (also referred to as a "bell," "bell head," or "bell") of a known diameter. The bell is positioned within an opening of a glass delivery tank containing molten glass using a bell positioning device. The bell positioning device may be used to adjust the position of the bell within the opening of the glass delivery tank such that tubing produced therefrom has a desired inner diameter and wall thickness (also referred to herein as "siding"). Once the bell is positioned within the opening of the glass delivery tank at the desired position, further movement of the bell within the opening may result in tubing siding variations. Unintentional bell movement can occur and result in tubing having more than the allowed variation in the siding. That is, the wall thickness of the resulting tubing is out of specification. Such tubing must be discarded, resulting in decreased manufacturing efficiencies and increased manufacturing costs.

Figure 6:
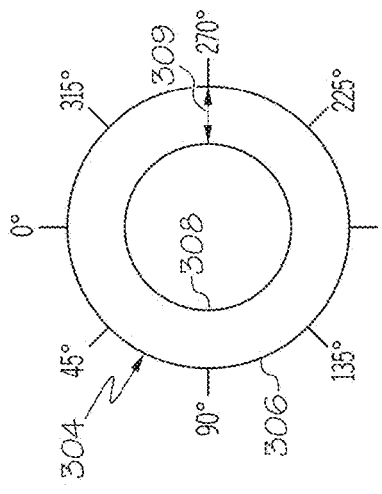
FIG. 6 is a schematic diagram of a glass tube showing the locations of siding measurements as a function of angular position.
Figure 7:
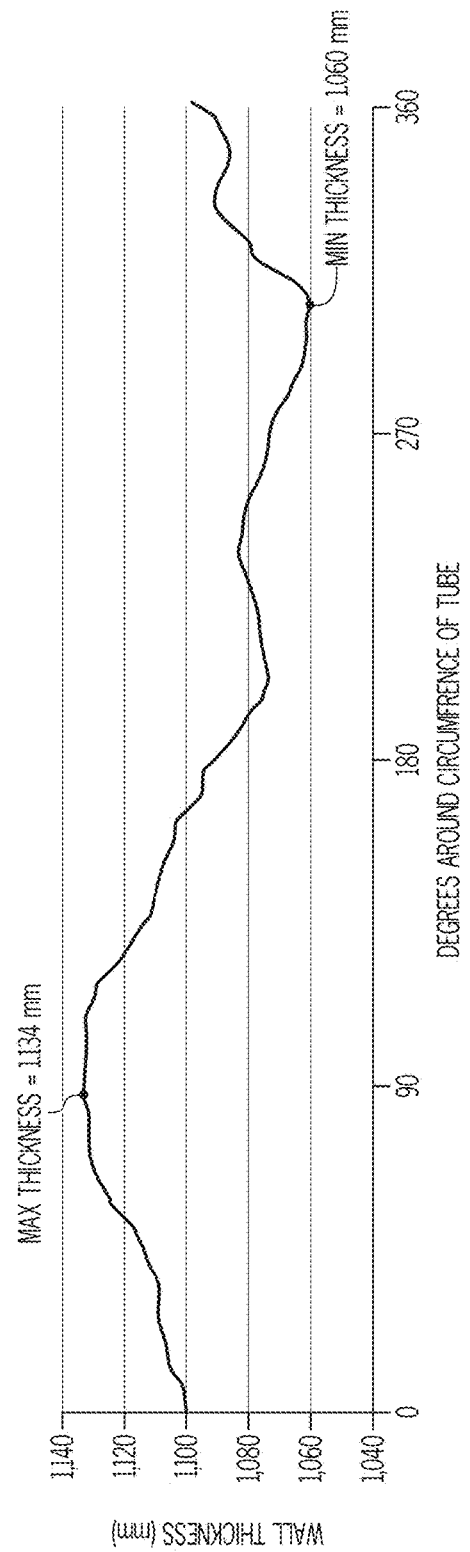
FIG. 7 graphically depicts siding variations as a function of location around the circumference of the glass tube of FIG. 6.

Specifically referring now to FIGS. 6-7 by way of example, a cross section of a glass tube 304 is depicted in FIG. 6 and plot of the tube siding (y-axis) as a function of angular position (x-axis) is shown in FIG. 7. The glass tube 304 has an outer tube wall surface 306 and an inner tube wall surface 308. The distance between the outer tube wall surface 306 and the inner tube wall surface 308 is the tube wall thickness 309. The tube wall thickness 309 of the glass tube 304 may be measured at a plurality of locations around the circumference of the glass tube 304. For example, tube wall thickness 309 measurements are typically measured at various angular locations, e.g. 0°, 45°, 90°, 135°, 180°, 225°, 270°, 315° and 360°, around the circumference of the glass tube 304 as depicted in FIG. 7. In the example depicted in FIGS. 6 and 7, the tube wall thickness varies from a maximum thickness of 1.134 millimeters (mm) to a minimum thickness of 1.060 mm with a maximum variation of the tube wall thickness 309 equal to 0.074 mm. The maximum variation in tube wall thickness is known as siding. That is, the siding of a tube is the difference between the maximum tube wall thickness and the minimum tube wall thickness for a given cross section. For example, the siding for the example depicted in FIGS. 6 and 7 is 0.074 mm. In the event that the siding specification for the glass tube 304 is less than 0.074 mm (e.g., 0.055 mm), the glass tube 304 falls outside the siding specification limit. Glass tube 304 that falls outside the siding specification limit is scrapped. It should be appreciated that measurements of the siding are taken along the length of glass tubing at discrete cross sections, either during or after manufacture of the glass tubing. The amount of glass tubing removed and scrapped due to the siding falling outside the siding specification limit is referred to as "siding loss."

Unintentional bell movement leading to siding loss may be due to non-uniform thermal expansion and thermal contraction of the bell positioning device. The source of this non-uniform thermal expansion and thermal contraction may be, for example, variations in the ambient conditions of the manufacturing environment in which the glass tubing manufacturing apparatus is located. These variations in the ambient conditions cause dimensional expansion or contraction of various components of the bell positioning device which, in turn, changes the position of the bell with respect to the glass delivery tank resulting in variations in the siding of the resulting glass tubing.

The embodiments of the bell positioning apparatuses described herein, and glass tubing manufacturing apparatuses comprising the same, mitigate dimensional variations in the bell positioning device and reduce thickness variations in the glass tubing produced therefrom.

Figure 2:
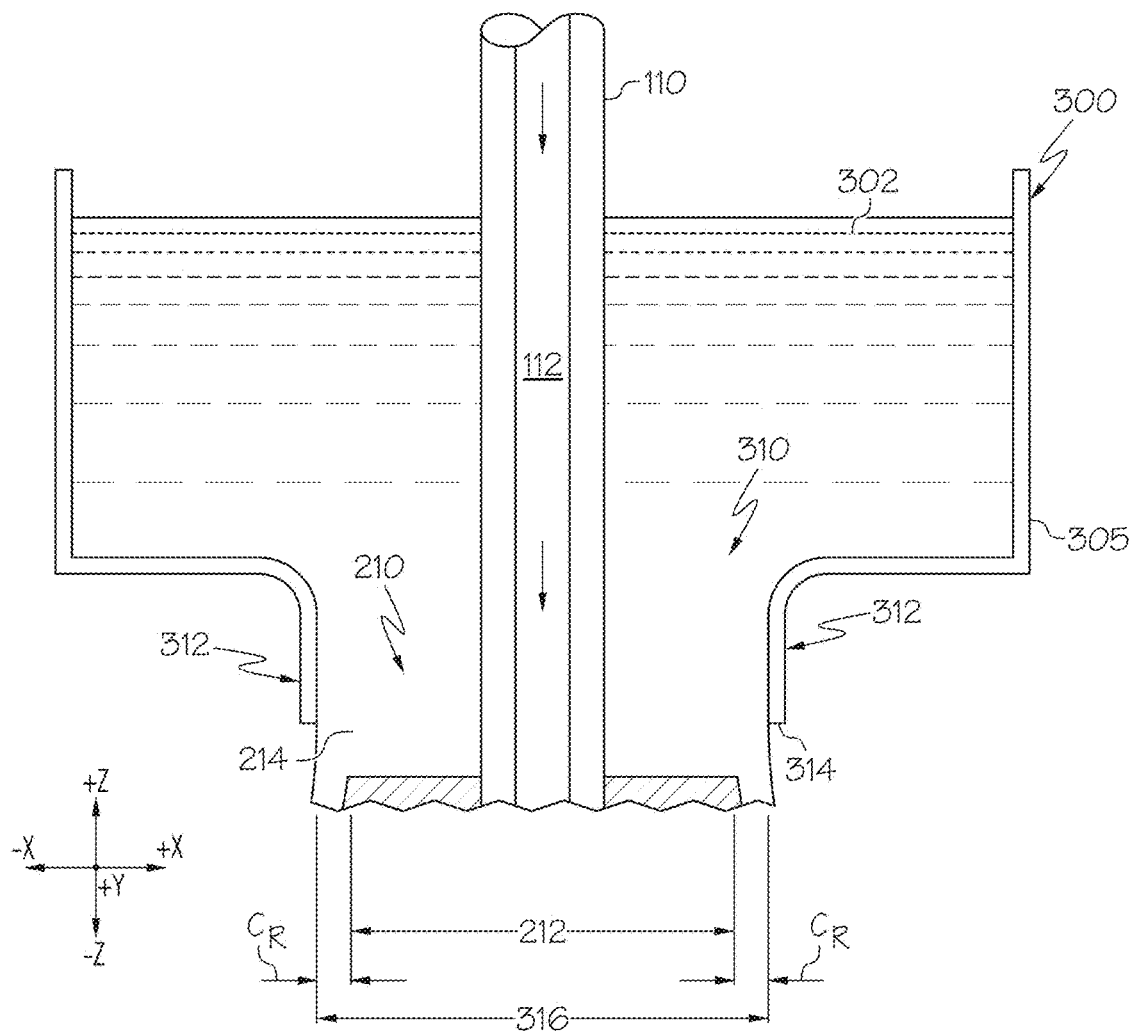
FIG. 2 is a schematic diagram of the circle region shown in FIG. 1 illustrating an enlarged view of a bell within a bottom opening of a glass delivery tank according to one or more embodiments shown and described herein.

Referring now to FIGS. 1-2, one embodiment of a bell positioning apparatus 100 of a glass tube manufacturing apparatus 300 is schematically depicted. Specifically, FIGS. 1 and 2 depict a front view of the bell positioning apparatus 100 and a front cross-sectional view of the glass tube manufacturing apparatus 300 in which the bell positioning apparatus 100 is incorporated. The bell positioning apparatus 100 and glass tube manufacturing apparatus 300 are generally vertically oriented (i.e., in the +/−Z-direction of the coordinate axes depicted in FIGS. 1-2) such that glass tubing 304 is drawn in the downward vertical direction (i.e., in the −Z-direction of the coordinate axes depicted in FIGS. 1-2).

The bell positioning apparatus 100 includes a frame 120 with at least one frame leg 122 and a platform 130. The at least one frame leg 122 are supported by a base 190 (e.g., a floor). The bell positioning apparatus 100 has a support positioning device 140. The support positioning device 140 is supported and attached to the platform 130, which, in turn, is supported by the at least one frame leg 122. In embodiments, the support positioning device 140 uses high temperature precision ball screws, linear slides, etc., to provide at least two-axis control (X-Y axis movement shown in FIG. 1), three-axis control (X-Y-Z axis movement shown in FIG. 1) or up to five-axis control of the support 110 with respect to the bottom opening of the glass delivery tank. The support positioning device 140 can include servo or variable frequency drive (VFD) motion devices that control the high temperature precision ball screws, linear slides, etc. The support positioning device 140 is connected to a support 110. The support 110 is connected to a bell 200 that is part of the glass tube manufacturing apparatus 300. Remote control and feedback from the support 110 can be included as part of the support positioning device 140. The support 110 can have a fluid supply channel 112, such as a pipe, conduit, or similar fluid delivery device, which is fluidly coupled to an internal chamber 202 of the bell 200. The fluid supply channel 112 may be operable to deliver a supply of pressurized fluid to the internal chamber 202. In the embodiments described herein, the pressurized fluid may be a pressurized gas, specifically air or an inert pressurized gas, including, without limitation, nitrogen, helium, argon, krypton, xenon, and the like. The gas supports the interior of the glass tube 304 after it flows past the bell 200 and no longer contacts the side wall 214 of the bell 200 as schematically depicted in FIG. 1. The glass tube manufacturing apparatus 300 includes a glass delivery tank 305 for supplying molten glass 302 to the bell 200.

In embodiments, a heating apparatus 218 with heating elements 219 may be disposed around the bell 200. In one embodiment, the heating apparatus 218 can include an infrared heating apparatus. However, it should be understood that other types of heating units may be used including, without limitation, focused infrared, resistive, induction and/or combinations thereof. Further, it should be understood that, while FIG. 1 depicts the heating apparatus as being disposed around the bell 200, the heating apparatus 218 may be integrated with the bell 200, such as when the heating apparatus 218 is a resistive heating apparatus.

Still referring to FIGS. 1-2, the glass tube manufacturing apparatus 300 for forming glass tube may further include a drawing mechanism 328. The drawing mechanism 328 is generally disposed below the bell 200 and may include at least one tractor wheel 329 operable to contact the glass tube drawn over the bell 200 and draw the glass tube downward. In embodiments, the glass tube manufacturing apparatus 300 can extend vertically through one or more floors of a building, structure, etc. In these embodiments, the bell positioning apparatus 100 can be located and supported on one floor (base 190) with the support 110 extending from the support positioning device 140 through the floor (base 190) and through the glass delivery tank 305 which is located and supported by a lower floor. In some embodiments, the glass tube manufacturing apparatus 300 with the bell positioning apparatus is structurally isolated from structures, equipment, etc., that can transmit vibrations to the glass tube manufacturing apparatus 300 such as walkways, floors with moving heavy equipment such as forklifts, etc. In embodiments, a glass melting furnace (not shown) rigidly connected to the glass tube manufacturing apparatus 300 can also be structurally isolated from the structures, equipment, etc., that can transmit vibrations to the glass tube manufacturing apparatus 300.

The bell 200 can have a top portion 210 with a top surface 211 and a side wall 214. The side wall 214 and a bottom edge 215 define the internal chamber 202 of the bell 200. The top surface 211 of the top portion 210 has an outer diameter 212. The bell 200 may have a variety of shapes including, without limitation, a substantially conical shape or, alternatively, a substantially parabolic shape. Accordingly, it should be understood that the bell may be of any shape and/or configuration suitable for expanding and thinning a tube of heated glass (i.e., molten glass) drawn over the surface of the bell. The material from which the bell 200 is formed is stable at elevated temperatures such that the bell does not contaminate heated glass drawn over the bell. Examples of suitable bell materials include but are not limited to refractory metals and alloys thereof, platinum-group metals, stainless steels, nickel, nickel-based alloys and ceramics such as, for example, zircon ($ZrSiO_4$) and alumina ($Al_2O_3$). Still referring to FIGS. 1-2, the glass delivery tank 305 has a bottom opening 310 with a bottom portion 312 that has an inner diameter 316. The bottom portion 312 has a bottom edge 314. The outer diameter 212 of the top portion 210 can be less than the inner diameter 316 of the bottom opening 310. A clearance $C_R$ between the top portion 210 and the bottom opening 310 governs, at least in part, the wall thickness of the glass tube drawn over the bell 200. In addition, and as the bell 200 is bell-shaped or parabolically-shaped, the outer diameter of the bell 200 increases along the length of the bell 200 in a downward direction. The position of the top portion 210 of the bell 200 relative to the bottom opening 310 may be adjusted to provide uniform flow of the molten glass 302 from the glass delivery tank 305 through the bottom opening 310 and over the bell 200.

Movement of the top portion 210 of the bell 200 with respect to the bottom opening 310 of the glass delivery tank 305 can result in variations in the wall thickness of the glass tube, as described above. As such, sources of undesired movement of the bell 200 should be minimized to avoid unacceptable variations in the dimensions of the glass tubing. For example, an increase or decrease in the length of one of the frame legs 122 due to thermal expansion (or contraction) as indicated by the arrow 10 in FIG. 1 compared to the other frame leg 122, can result in movement of the support 110 and thus movement of the bell 200 as indicated by the arrow 12. In order to minimize dimensional changes between frame legs 122, a frame leg dimensional stability apparatus 150 is utilized in conjunction with each frame leg 122. The frame leg dimensional stability apparatus 150 maintains a temperature variation between each frame leg 122 to within 6.5° C./m of distance (W) between each frame leg 122 over an extended time period, e.g. 4 hours, 8 hours, 24 hours, or longer. In embodiments, the temperature of each frame leg 122 is set and maintained to within 6.5° C. of a set point temperature by the frame leg dimensional stability apparatus 150. In embodiments, the set point temperature is a temperature above or below an ambient temperature where the glass tube manufacturing apparatus 300 is located. For example, if the glass tube manufacturing apparatus 300 is located in a structure, building, etc., with an ambient temperature of 20° C., the set point temperature can be greater than the ambient temperature, such as, for example and without limitation, 22° C., 25° C., 30° C., or a temperature between 20-22° C., 22-25° C. or 25-30° C., or even a temperature above 30° C. Alternatively, the set point temperature can be a temperature less than the ambient temperature, such as, for example and without limitation, 18° C., 10° C., 0° C., or even a temperature between 20-18° C., 18-10° C. or 10-0° C., or a temperature below 0° C. In some embodiments, the set point temperature may be equal to the ambient temperature. In other embodiments, the set point temperature is a temperature above a maximum ambient temperature or below a minimum ambient temperature where the glass tube manufacturing apparatus 300 is located. For example, if the glass tube manufacturing apparatus 300 is located in a structure, building, etc., with a maximum ambient temperature of 35° C., the set point temperature can be 37° C., 40° C. or a temperature between 35-37° C. or 37-40° C., or a temperature above 40° C. Alternatively, if the glass tube manufacturing apparatus 300 is located in a structure, building, etc., with a minimum ambient temperature of 15° C., the set point temperature can be 13° C., 10° C., 0° C., or a temperature between 15-13° C., 13-10° C., 10-0° C. or a temperature below 0° C. It should be appreciated that maintaining the temperature of each frame leg 122 to within 6.5° C. of a set point temperature decouples the temperature of each frame leg from surrounding ambient temperatures. While FIG. 1 schematically depicts at least one frame leg 122, it should be understood that other embodiments are contemplated and possible. For example in an alternative embodiment (not shown), the frame leg dimensional stability apparatus 150 has one frame leg 122 that supports the platform 130 and support positioning device 140. In such an embodiment, the frame leg dimensional stability apparatus 150 maintains a temperature variation along a width (X-direction) and a thickness (Y-direction) of the frame leg 122 to within 6.5° C. of the set point temperature thereby decoupling the temperature of the frame leg 122 from surrounding ambient temperatures.

Figure 3:
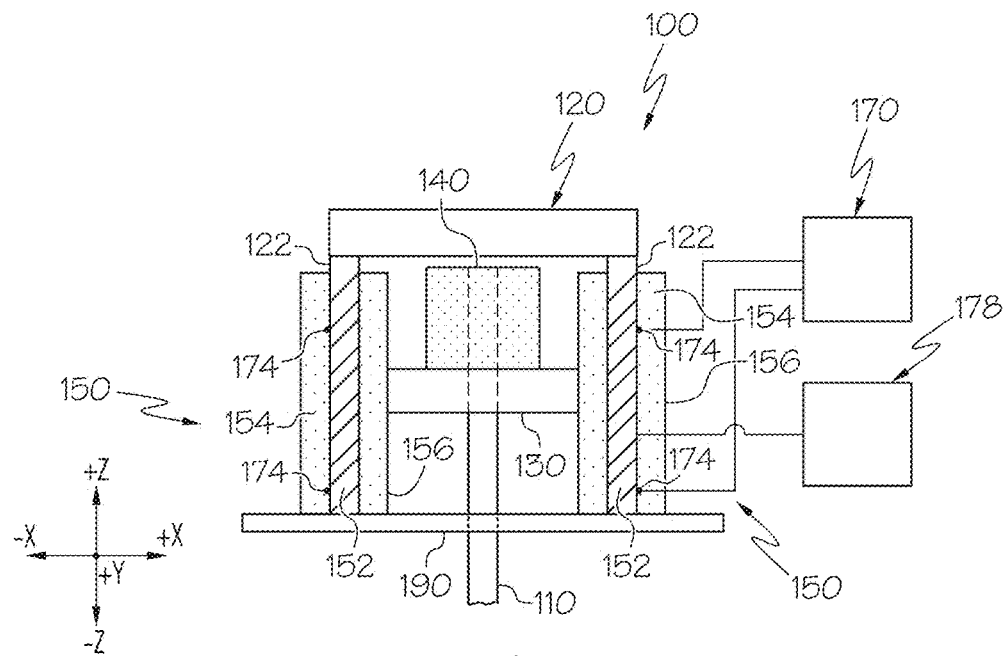
FIG. 3 is a schematic diagram of a side cross section view of a bell positioning apparatus according to one or more embodiments shown and described herein.

Referring now to FIGS. 1-3, FIG. 3 illustrates an embodiment of a frame leg dimensional stability apparatus 150. The frame leg dimensional stability apparatus 150 includes a temperature control component 152 within an enclosure 156. That is, each of the frame legs 122 is located within an enclosure 156 and surrounded by the temperature control component 152. In the embodiment depicted in FIG. 3, the temperature control component 152 is in the form of electrical resistance heating wire, heating tape, etc., wound around the length of the frame leg 122. While FIG. 3 schematically depicts electrical resistance heating wire or heating tape wound around the frame leg, it should be understood that other embodiments are contemplated and possible. For example in alternative embodiment (not shown), the temperature control component 152 may comprise heating elements embedded in silicone rubber pads such as silicone rubber heaters available from Watlow Electric Manufacturing Company. These pads may be attached to the frame legs with, for example, silicone RTV (room temperature vulcanizing) adhesive. The temperature control component is electrically coupled to a power supply 178 which supplies electrical current to the temperature control component 152. It should be appreciated that the electrical current flows through the temperature control component 152 and results in, for example, resistance heating of the temperature control component 152. The temperature control component 152, upon heating, transfers energy (heat) to the frame leg 122. The temperature control component 152 may be coupled to the frame leg 122, such as by winding, adhesive, mechanical fasteners or the like, such that the length of the frame leg 122 is uniformly heated. In embodiments, insulation 154 can be included within the enclosure 156 and help maintain uniformity of heating along the length of each frame leg 122. The insulation 154 also insulates each frame leg 122 from ambient conditions outside of the enclosure 156.

In embodiments, a temperature controller 170 can be communicatively coupled with the power supply 178 and with one or more temperature sensors 174 within the enclosure 156. The one or more of the temperature sensors 174 can be located along the length of the frame leg 122 and can provide a temperature signal, e.g. a voltage proportional to a temperature sensed by a temperature sensor, to the temperature controller 170. In embodiments, the temperature sensor can be, for example, a dual type-K surface mounted thermocouple affixed to the frame leg or positioned in close proximity to the frame leg. However, it should be understood that other types of temperature sensors are contemplated and possible. One or more of the temperature sensors 174 can be directly in contact with the frame leg 122 or spaced apart from the frame leg 122 within the insulation 154. The temperature controller 170 can receive temperature signals from the one or more temperature sensors 174 and provide temperature readings for the locations where the temperature sensors 174 are positioned along the frame leg 122 and provide an average temperature of the frame leg 122. Based on the temperature readings, the temperature controller 170 can transmit instructions to the power supply 178 to increase, decrease, or maintain an electrical current provided to and flowing through the temperature control component 152. The power supply 178 can receive the instructions, and in response, increase, decrease, or maintain an electrical current provided to and flowing through the temperature control component 152. The instructions from the temperature controller 170 to the power supply 178, and the response by the power supply 178, establish and maintain a temperature variation of the frame leg 122 within 6.5° C. over an extended time period, e.g. 4 hours, 8 hours, 24 hours, or longer.

In embodiments, the temperature controller 170 can maintain a temperature variation between each frame leg 122 to within 6.5° C./m of distance between the frame legs 122. For example, the temperature controller 170 can receive temperature signals from the one or more temperature sensors 174 directly in contact with each frame leg 122 or spaced apart from each frame leg 122 with the insulation 154. Based on the temperature readings, the temperature controller 170 can transmit instructions to the power supply 178 (or to more than one power supply—not shown) to increase, decrease, or maintain an electrical current provided to and flowing through one or more of the temperature control components 152 coupled to one or more of the frame legs 122. The power supply 178 can receive the instructions, and in response, increase, decrease, or maintain an electrical current provided to and flowing through one or more of the temperature control components 152. The instructions from the temperature controller 170 to the power supply 178, and the response by the power supply 178, establish and maintain an average temperature of each frame leg 122 and a temperature variation between each frame leg 122 within 6.5° C./m of distance between frame legs 122.

In embodiments, the temperature control component 152 can be a plurality of temperature control components 152 located along the length of the frame leg 122. The length of the frame leg 122 can be divided into different zones with each zone having its own temperature control component 152 (not shown). Each temperature control component 152 can be independently supplied with electrical current from the power supply 178. Each zone can have its own temperature sensor 174 and the temperature controller 170 can provide instructions to the power supply 178 to increase, decrease or maintain an electrical current to a particular temperature control component 152 within a particular zone. The power supply 178 can receive the instructions, and in response, increase, decrease, or maintain an electrical current provided to and flowing through a temperature control component 152 within a particular zone. While the temperature control component 152 of FIG. 3 has been described herein as electrical resistance heating wire, heating tape, etc., it should be appreciated that the temperature control component 152 can be a cooling component (e.g., a coolant line wound around the length of the frame leg 122 through which a cooling fluid flows) that cools the length of the frame leg 122 such that a temperature variation within 6.5° C./m of distance between frame legs is maintained for an extended time period, e.g. 4 hours, 8 hours, 24 hours or longer.

Figure 4:
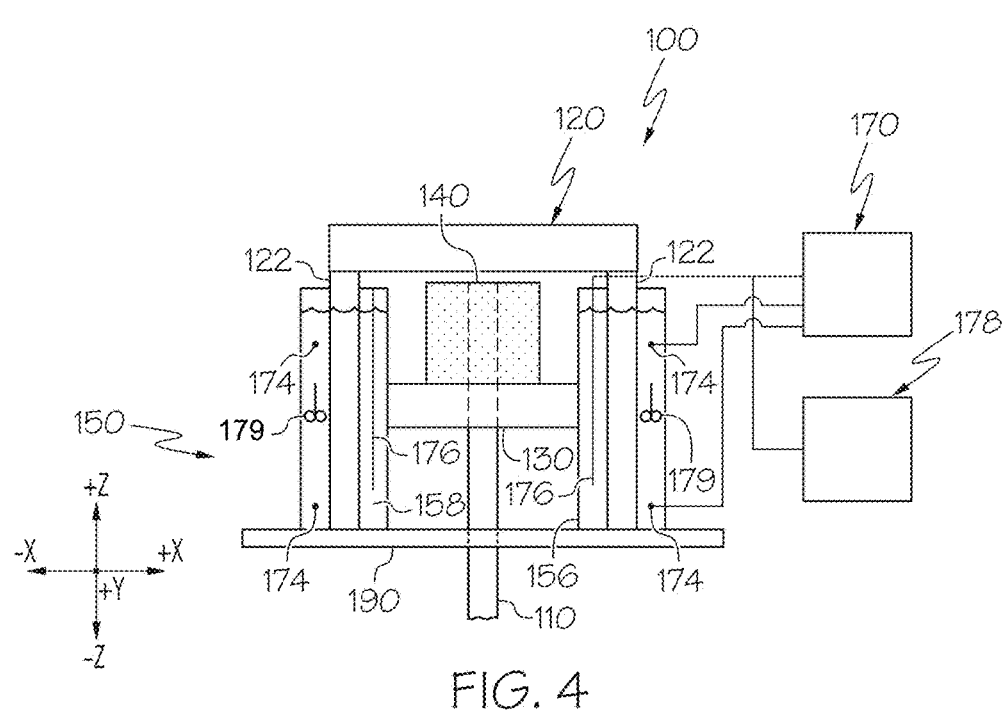
FIG. 4 is a schematic diagram of a side cross section view of a bell positioning apparatus according to one or more embodiments shown and described herein.

Referring now to FIGS. 1-4, another embodiment of a frame leg dimensional stability apparatus 150 is shown in FIG. 4. In the embodiment depicted in FIG. 4 the frame leg dimensional stability apparatus 150 contains a temperature control component in the form of a liquid 158 within the enclosure 156 in which the frame leg 122 is positioned. More specifically, each of the frame legs 122 is located within a separate enclosure 156 and is surrounded by the liquid 158. That is, each frame leg 122 is immersed within the liquid 158. Suitable liquids include but are not limited to water, oil or glycol. In embodiments, a heating element 176 is also located in the liquid 158 and is electrically coupled to a power supply 178. The power supply supplies current to the heating element 176. It should be appreciated that the electrical current passes through the heating element 176 and results in resistance heating of the heating element 176. The heating element 176 transfers energy (heat) to the liquid 158, which in turn transfers heat to the frame leg 122. A stirring device 179 can be located within the liquid 158 to stir the liquid 158 and ensure uniform temperature of the liquid 158 throughout the enclosure 156. While FIG. 4 schematically depicts each frame leg 122 within an enclosure 156 surrounded by liquid 158, it should be understood that other embodiments are contemplated and possible. For example in an alternative embodiment (not shown), the frame legs 122 are hollow and the liquid 158 and the heating element 176 are contained within the hollow frame legs 122. In another embodiment, the liquid 158 may be directed through the hollow frame legs 122, such as with a pump or other apparatus, and the heating element 176 may be external to the frame legs 122.

Still referring to FIG. 4, a temperature controller 170 can be communicatively coupled with the power supply 178 and with one or more temperature sensors 174 within the enclosure 156. The one or more temperature sensors 174 can be located along the length of the frame leg 122. In embodiments, the temperature sensor can be, for example, a dual type-K surface mounted thermocouple affixed to the frame leg or positioned in close proximity to the frame leg.

However, it should be understood that other types of temperature sensors are contemplated and possible. One or more of the temperature sensors 174 can be directly in contact with the frame leg 122 or spaced apart from the frame leg 122 within the liquid 158. The temperature controller 170 can receive temperature signals from the one or more temperature sensors 174. Upon receiving the temperature signals the temperature controller 170 can transmit instructions to the power supply 178 to increase, decrease, or maintain an electrical current provided to and flowing through the heating element 176. The power supply 178 can receive the instructions, and in response, increase, decrease, or maintain an electrical current provided to and flowing through the heating element 176. The instructions from the temperature controller 170 to the power supply 178, and the response by the power supply 178, establish and maintain a uniform temperature of the liquid 158 throughout the enclosure 156 and a temperature variation within 6.5° C./m of distance between frame legs is maintained for an extended time period, e.g. 4 hours, 8 hours, 24 hours or longer. It should be appreciated that, in addition to the heating element 176, the enclosure 156 can also include a cooling element, e.g. a coolant line within the liquid 158 that cools the liquid 158 and thus cools the length of the frame leg 122 such that a temperature variation within 6.5° C./m of distance between frame legs is maintained for an extended time period, e.g. 4 hours, 8 hours, 24 hours or longer. It should also be appreciated that the heating element 176 can be a gas heating element that is heated with combusted gas products provided by the power supply 178, the power supply 178 being a gas heater.

Figure 5:
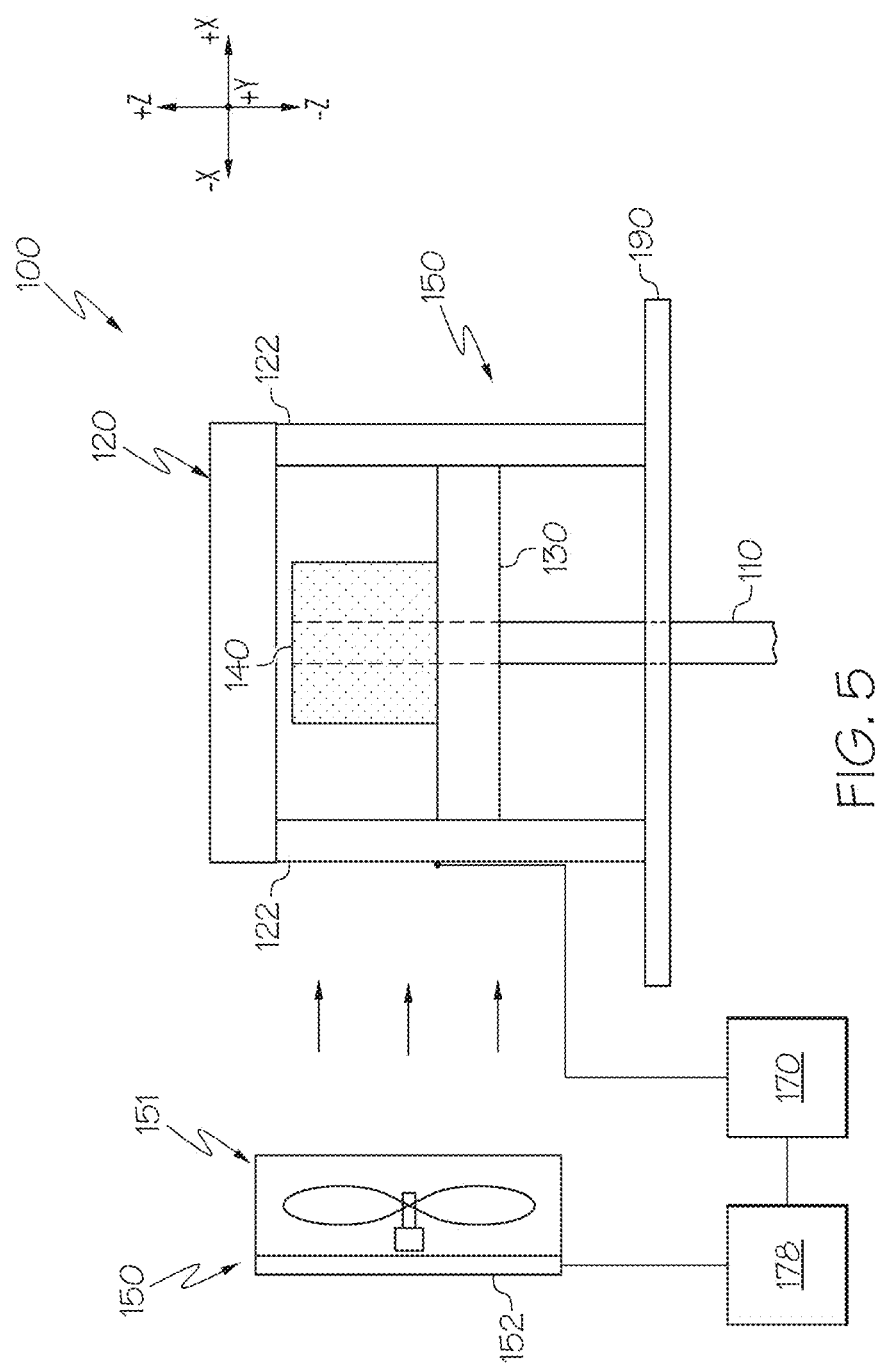
FIG. 5 is a schematic diagram of a side cross section view of a bell positioning apparatus according to one or more embodiments shown and described herein.

Referring now to FIGS. 1-5, another embodiment of a frame leg dimensional stability apparatus 150 is shown in FIG. 5. In this embodiment, the frame leg dimensional stability apparatus 150 contains an air flow device 151, such as a fan or the like, which directs air across the frame legs 122. As depicted in FIG. 5, the frame legs 122 are not within an enclosure. However, in an alternative embodiment, the frame legs 122 can be positioned within an enclosure and the air flow device 151 can direct air into the enclosure, such as with a conduit or the like, and across or along the frame legs 122. Air directed across or along the frame legs 122 can be either heated or cooled by a temperature control component 152, that is, air can be either heated or cooled as it flows through the temperature control component 152. One or more temperature sensors can be in direct contact with each frame leg 122 and the temperature controller 170 can receive signals from each of the one or more temperature sensors 174. Based on the temperature readings, the temperature controller 170 can transmit instructions to the power supply 178 to increase, decrease, or maintain an electrical current provided to and flowing through the temperature control component 152. The power supply 178 can receive the instructions, and in response, increase, decrease, or maintain an electrical current provided to and flowing through temperature control component 152. The temperature control component 152 heats or cools air in response to the electrical current provided by the power supply 178. The instructions from the temperature controller 170 to the power supply 178, and the response by the power supply 178, establish and maintain a temperature variation within 6.5° C./m of distance between frame legs for an extended time period, e.g. 4 hours, 8 hours, 24 hours or longer. Referring again to FIGS. 1-3, in operation, the glass tube manufacturing apparatus 300 provides for the manufacture of glass tubing with reduced sidewall dimensional variations. The top portion 210 of the bell 200 is initially positioned within the bottom opening 310 of the glass delivery tank 305 with a clearance $C_R$ between the side wall 214 of the bell 200 and the bottom opening 310 of the glass delivery tank 305 using the support positioning device 140. Molten glass 302 is delivered to the glass delivery tank 305 and uniformly flows through the bottom opening 310 and over the bell 200, thereby forming the glass tube 304. The temperature along the length of each frame leg 122 is monitored with the one or more temperature sensors 174 and the temperature controller 170. In response to receiving temperature signals from the one or more temperature sensors 174, the temperature controller 170 transmits instructions to the power supply 178 to increase, decrease or maintain an electrical current provided to and flowing through one or more of the temperature control components 152 associated with each frame leg 122. The power supply 178 receives the instructions, and in response, increases, decreases, or maintains an electrical current provided to and flowing through one or more of the temperature control components 152. The instructions from the temperature controller 170 to the power supply 178, and the response by the power supply 178, establish and maintain a temperature variation within 6.5° C./m of distance between frame legs for an extended time period, e.g. 4 hours, 8 hours, 24 hours or longer. Maintaining the temperature variation between each frame leg 122 limits the movement of the bell 200 within the bottom opening 310 during formation of the glass tube 304 due to temperature variations between frame legs 122. That is, maintaining the temperature variation along the length of each frame leg 122 minimizes thermal expansion and/or contraction of the frame legs 122 during forming of the glass tube and provides stable and precise positioning of the bell 200 within the bottom opening 310 of the glass delivery tank 305 during forming of the glass tube 304. In embodiments, the movement of the bell within the bottom opening is limited to less than 100 micrometers, preferably less than 50 micrometers, and more preferably less than 25 micrometers through control of the temperature of the frame legs 122.

While FIGS. 1 and 3-5 schematically depict temperature control of the frame legs 122 to minimize movement of the bell 200, it should be understood that other embodiments are contemplated and possible. For example, in alternative embodiments (not shown) the geometry of the frame 120 can be altered to minimize movement of the bell 200. In embodiments, the distance between frame legs 122 is increased and/or the length of the frame legs is decreased. For example, doubling the distance W between the frame legs 122 or reducing the length L of the frame legs 122 by one-half reduces the movement of the bell 200 by one-half.

EXAMPLES

The embodiments described herein will be further clarified by the following examples.

Example 1

Figure 9:
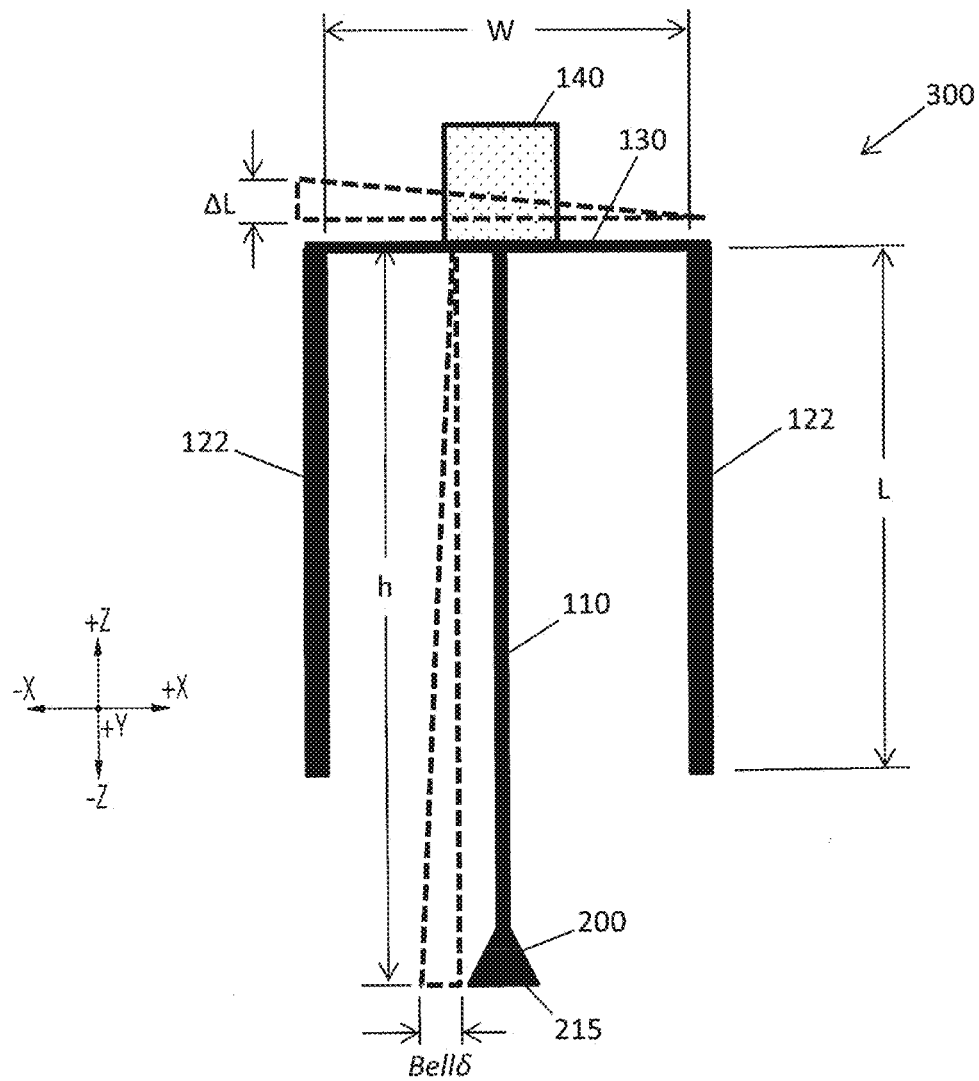
FIG. 9 is a schematic diagram of a glass tubing manufacturing apparatus used for modeling movement of a bell during manufacture of glass tubing.

Referring now to FIG. 9, a simplified diagram of the glass tube manufacturing apparatus 300 without a frame leg dimensional stability apparatus 150 was modeled to calculate movement of the bell 200 that occurs due to thermal expansion of the left frame leg 122 relative to the right frame leg 122 and which, in turn, affects the siding of the glass tube formed therefrom. The parameters of the model included the frame legs 122 being made from steel with a coefficient of thermal expansion of $11.7 \times 10^{-6}$ m/° C. and the length (L) of the frame legs 122 from the base 190 (not shown) to the top of the platform 130 where the support positioning device 140 is located was 1.95 m. The distant between the center of the bell 200 and each frame leg 122 (X-direction) was 0.27 m and the overall distance (W) between the two frame legs 122 was 0.54 m. The distance (h) between the top of the platform 130 where the support positioning device 140 is located and the bottom edge 215 of the bell 200 was 1.36 meters. The change in temperature (ΔT) between the left frame leg 122 and the right frame leg 122 over a time period of 4 hours was 3.6° C. The ΔT resulted in an expansion (growth) of the left frame leg 122 (ΔL) relative to the right frame leg 122 in the +Z-direction of 82.2 micrometers and the expansion of the left frame leg 122 by 82.2 micrometers resulted in a displacement of the bell 200 (Bellδ) by 206.3 micrometers.

Analytically, the displacement of the bell 200 can be described by the relation:

$$Bell\delta = (\Delta T * L * CTE_L) * h/W \qquad (1)$$

where Bellδ is the displacement of the bell 200, ΔT is the difference in temperature between the frame legs 122 over a given time period, L is the length of the frame legs 122 from the base 190 to the top of the platform 130 where the support positioning device 140 is located, $CTE_L$ is the coefficient of thermal expansion for the frame legs 122, h is the length of the support 110 from the top of the platform 130 where the support positioning device 140 is located to the bottom edge 215 of the bell 200, and W is the distance between the frame legs 122. As shown by relation (1), there is a linear relationship between the movement of the bell 200, and the difference in temperature (ΔT) between the frame legs 122 over a given time period. Considering relation (1), if the temperature variation between frame legs is maintained to within 6.5° C./m of distance between each frame leg 122 (i.e., ΔT/W is less than or equal to 1° C./m), the displacement of the bell 200 is reduced to 57.3 micrometers (μm). In the embodiments described herein, frame leg dimensional stability apparatuses are used to control the bell displacement to be less than or equal to 100 μm or even less than or equal to 200 μm over a time period of 4 hours in order to minimize siding losses. In some embodiments, frame leg dimensional stability apparatuses are used to control the bell displacement to be less than or equal to 75 μm or even less than or equal to 50 μm over a time period of 4 hours. In some other embodiments, frame leg dimensional stability apparatuses are used to control the bell displacement to be less than or equal to 25 μm over a time period of 4 hours.

As noted herein above, in some embodiments the glass tube manufacturing apparatus includes at least one frame leg. In embodiments where the at least one frame leg is one frame leg (such as when the platform of the glass tube manufacturing apparatus is cantilevered from the at least one frame leg), the difference in temperature (ΔT) is a temperature variation across a width of the frame leg. Further, it should be understood that the frame legs may include other structural members, such as braces, gussets, brackets and the like, which may couple the platform to the frame legs. It will be understood that, in determining the displacement of the bell, the coefficient of thermal expansion of these structural members should be taken into account to.

Example 2

Figure 8:
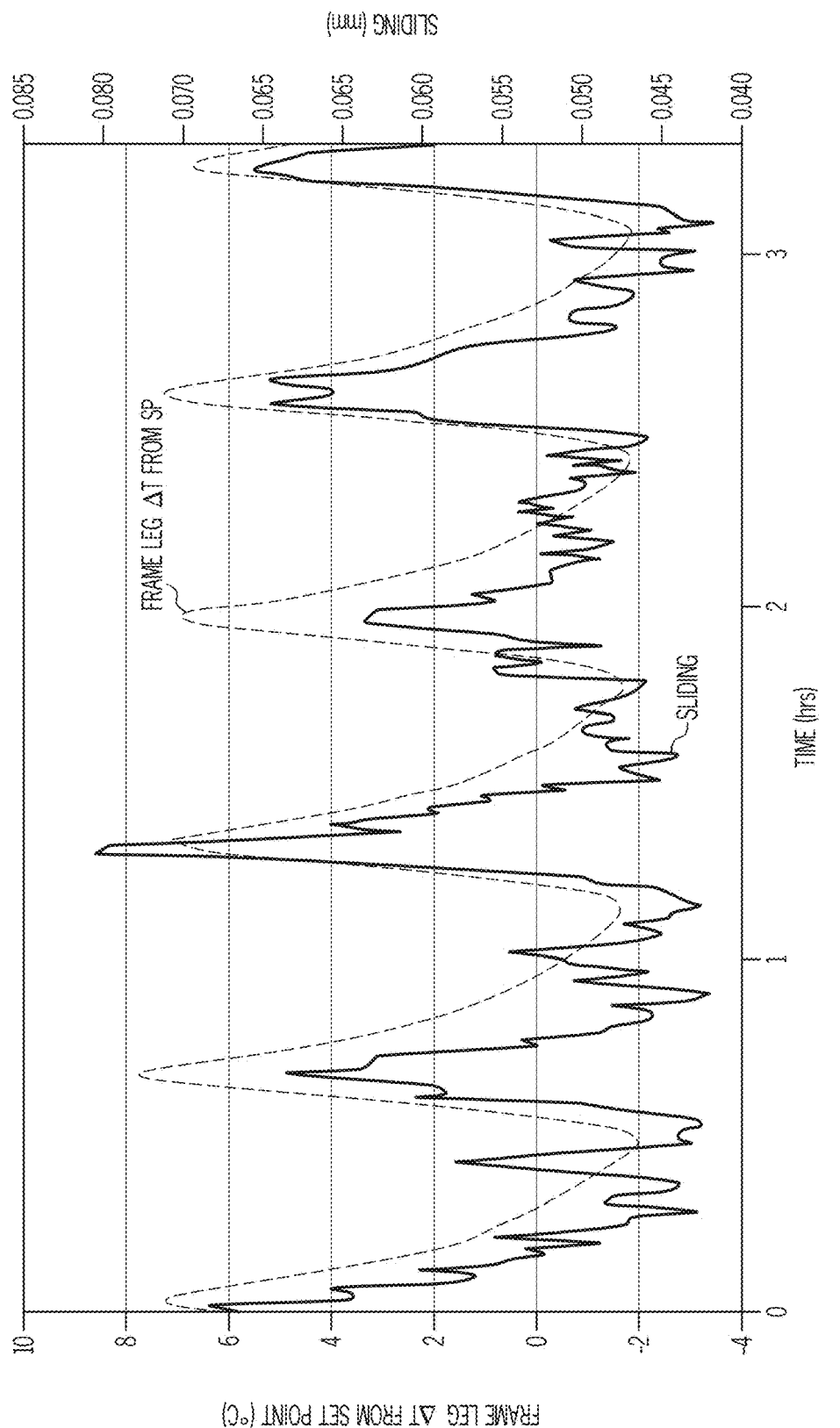
FIG. 8 graphically depicts siding versus time and change in frame leg temperature ($\Delta T$) from a set point (SP)

Referring now to FIG. 8, experimental data of siding versus change in temperature (ΔT) for a frame leg 122 from a set point (SP) as a function of time for a glass tube manufacturing apparatus 300 is shown. Particularly, the average temperature of a frame leg 122 was cyclically varied above and below a set point during a glass tubing manufacturing run for a time period of approximately 3.25 hours. The change in temperature from the set point is represented on the left Y-axis and siding of the glass tubing produced during the glass run is represented on the right Y-axis. Time, in hours, is represented on the X-axis. As shown in FIG. 8, the amount of siding follows the change in average temperature of the frame leg 122 and verifies the relationship between maintaining the temperature variation between each frame leg 122 and displacement of the bell 200. That is, as the difference in temperature ΔT increases, the siding of the glass tube produced by the glass tube manufacturing apparatus also increases.

In addition to the characteristics of the glass tube formed utilizing the apparatuses described herein, the apparatuses described herein are also economical and easy to incorporate. For example, the apparatuses described herein can be adapted for use in current bell positioning apparatuses without alteration to such apparatuses.

It will be apparent to those skilled in the art that various modifications and variations can be made to the embodiments described herein without departing from the spirit and scope. Thus it is intended that the embodiments described herein cover any modifications and variations provided they come within the scope of the appended claims and their equivalents.

The invention claimed is:

1. A bell positioning apparatus for a glass tubing manufacturing apparatus comprising:
    a bell configured for a glass tube to be drawn over;
    a support connected to the bell;
    a frame with at least one frame leg, a platform and a support arm attached to the platform and the support, the support arm configured to move the support with at least two degrees of freedom;
    a frame leg dimensional stability apparatus operatively coupled to the at least one frame leg and configured to maintain a deflection δ of the bell to less than 200 microns over a time period of 4 hours, wherein:

$$\delta = (\Delta T * L * CTE_L) * h/W;$$

ΔT is a temperature variation across a width of the at least one frame leg over a time period of 4 hours when the at least one frame leg is a single frame leg or a temperature variation between two frame legs over a time period of 4 hours when the at least one frame leg is more than one frame leg;
    L is a length of the at least one frame leg;
    $CTE_L$ is the coefficient of thermal expansion of the at least one frame leg;
    h is a length of the support from a top of the platform to a bottom edge of the bell; and
    W is the width of the at least one frame leg when the at least one frame leg is a single frame leg or a distance between two frame legs when the at least one frame leg is more than one frame leg.

2. The bell positioning apparatus of claim 1, wherein the frame leg dimensional stability apparatus is configured to maintain a temperature variation within 6.5° C./m of a width or a thickness of the at least one frame leg over a time period of 4 hours.

3. The bell positioning apparatus of claim 1, wherein the frame leg dimensional stability apparatus is configured to maintain a temperature variation between the at least one frame leg and at least one other frame leg of the frame to within 6.5° C./m of a distance between the frame legs over a time period of 4 hours.

4. The bell positioning apparatus of claim 1, wherein the frame leg dimensional stability apparatus comprises a temperature control component selected from the group consisting of:
heating pads;
electrical resistance heating wire;
heating tape;
heated fluid directed across each frame leg;
heated fluid within each frame leg; and
heated fluid in which each frame leg is immersed.

5. The bell positioning apparatus of claim 4, wherein the temperature control component is heating pads attached to each frame leg, and further comprising an enclosure surrounding the temperature control component and insulating each frame leg and the temperature control component from ambient temperatures during glass tubing manufacturing.

6. The bell positioning apparatus of claim 5, further comprising insulation within the enclosure.

7. The bell positioning apparatus of claim 6, wherein the frame leg dimensional stability apparatus comprises at least one temperature sensor, a temperature controller and a power supply, the at least one temperature sensor communicatively coupled with the temperature controller, the power supply communicatively coupled with the temperature control component and the temperature controller communicatively coupled with the power supply, wherein the temperature controller receives temperature signals from the at least one temperature sensor and provides instructions to the power supply to increase, decrease, or maintain an electrical current provided to the temperature control component.

8. The bell positioning apparatus of claim 4, wherein the temperature control component is heated liquid in which each frame leg is immersed.

9. The bell positioning apparatus of claim 8, further comprising a heating element within the heated liquid.

10. The bell positioning apparatus of claim 9, wherein the frame leg dimensional stability apparatus comprises at least one temperature sensor, a temperature controller and a power supply, the at least one temperature sensor communicatively coupled with the temperature controller, the power supply communicatively coupled with the temperature control component and the temperature controller communicatively coupled with the power supply, wherein the temperature controller receives temperature signals from the at least one temperature sensor and provides instructions to the power supply to increase, decrease, or maintain an electrical current provided to the heating element.

11. A glass tubing manufacturing apparatus comprising:
a glass delivery tank with molten glass, the glass delivery tank having a bottom opening with an inner diameter;
a bell having an upper portion with an outer diameter, wherein a clearance is present between the inner diameter of the bottom opening and the outer diameter of the bell;
a support connected to the bell, the support extending up through the glass delivery tank to a bell positioning apparatus, the bell positioning apparatus comprising:
a frame having at least one frame leg, a platform and a support arm, the platform attached to the frame, the support arm attached to the platform and the support attached to the support arm, the bell positioning apparatus configured to move and position the bell relative to the bottom opening of the glass delivery tank; and
a frame leg dimensional stability apparatus comprising:
a temperature control component selected from the group consisting of heating pads attached the at least one frame leg; electrical resistance heating wire wound around a length the at least one frame leg, heating tape wound around the length of the at least one frame leg;
heated fluid directed across the at least one frame leg;
heated fluid within the at least one frame leg; and
heated liquid in which the at least one frame leg is immersed;
one or more temperature sensors located along the length of the at least one frame leg; and
a temperature controller communicatively coupled with the one or more temperature sensors; and
a power supply operable to heat the temperature control component;
wherein the one or more temperature sensors, temperature controller and power supply are configured to:
maintain a temperature variation within 6.5° C./m of a width or a thickness of the at least one frame leg over a time period of at least 4 hours; or
maintain a temperature variation between the at least one frame leg and at least one other frame leg of the frame to within 6.5° C./m of a distance between the frame legs over a time period of at least 4 hours.

12. The glass tubing manufacturing apparatus of claim 11, wherein the temperature control component is the heating pads attached to the at least one frame leg, and further comprising an enclosure surrounding the temperature control component and insulating the at least one frame leg and the temperature control component from ambient temperatures during glass tubing manufacturing.

13. The glass tubing manufacturing apparatus of claim 12, further comprising insulation within the enclosure.

14. The glass tubing manufacturing apparatus of claim 11, wherein the temperature controller receives temperature signals from the one or more temperature sensors and provides instructions to the power supply to increase, decrease, or maintain an electrical current provided to the temperature control component.

15. The glass tubing manufacturing apparatus of claim 11, wherein the temperature control component is the heated fluid in which the at least one frame leg is immersed.

16. The glass tubing manufacturing apparatus of claim 15, further comprising a heating element within the heated fluid.

17. The glass tubing manufacturing apparatus of claim 16, wherein the temperature controller receives temperature signals from the one or more temperature sensors and provides instructions to the power supply to increase, decrease, or maintain an electrical current provided to the heating element.

18. A method for manufacturing glass tubing comprising:
melting a glass composition in a glass delivery tank and producing molten glass, the glass delivery tank having a bottom opening with an inner diameter;
drawing the molten glass around a bell thereby forming a glass tube, the bell having an upper portion with an outer diameter, the glass tube forming in a space between the inner diameter of the bottom opening and the outer diameter of the bell;
positioning the bell relative to the bottom opening of the glass delivery tank using a support connected to the bell, the support extending up through the glass delivery tank to a bell positioning apparatus, the bell positioning apparatus comprising:
    a frame having at least one frame leg, a platform and a support arm, the platform attached to the frame, the support arm attached to the platform and the support, the bell positioning apparatus configured to move and position the upper portion of the bell relative to the bottom opening of the glass delivery tank; and
    a frame leg dimensional stability apparatus configured to:
        maintain a temperature variation within 6.5° C./m of a width or a thickness of the at least one frame leg over a time period of at least 4 hours; or
        maintain a temperature variation between the at least one frame leg and at least one other frame leg of the frame to within 6.5° C./m of a distance between the frame legs over a time period of at least 4 hours.

19. The method of claim 18, further comprising attaching a temperature control component to each frame leg and increasing or decreasing electrical current to the temperature control component to:
    maintain the temperature variation within 6.5° C./m of the width or the thickness of the at least one frame leg over the time period of at least 4 hours; or
    maintain the temperature variation between the at least one frame leg and the at least one other frame leg of the frame to within 6.5° C./m of the distance between the frame legs over the time period of at least 4 hours.

20. The method of claim 19, further comprising one or more temperature sensors located along a length of each frame leg, a temperature controller communicatively coupled with the one or more temperature sensors, and a power supply communicatively coupled with the temperature control component and the temperature controller, wherein the temperature controller receives temperature signals from the one or more temperature sensors and provides instructions to the power supply to increase, decrease, or maintain the electrical current provided to the temperature control component.

21. The method of claim 18, further comprising placing each of the frame legs in a heated liquid bath, the heated liquid bath maintaining:
    the temperature variation within 6.5° C./m of the width or the thickness of the at least one frame leg over the time period of at least 4 hours; or
    the temperature variation between the at least one frame leg and the at least one other frame leg of the frame to within 6.5° C./m of the distance between the frame legs over the time period of at least 4 hours.

22. The method of claim 21, further comprising a heating element within each liquid bath, one or more temperature sensors located along a length of each frame leg within the heated liquid bath, a temperature controller communicatively coupled with the one or more temperature sensors, and a power supply communicatively coupled with the heating element and the temperature controller, wherein the temperature controller receives temperature signals from the one or more temperature sensors and provides instructions to the power supply increase, decrease, or maintain an electrical current provided to the heating element.

23. A bell positioning apparatus for a glass tubing manufacturing apparatus comprising:
    a bell configured for a glass tube to be drawn over;
    a support connected to the bell;
    a frame with at least one frame leg, a platform and a support arm attached to the platform and the support, the support arm configured to move the support with at least two degrees of freedom; and
    a frame leg dimensional stability apparatus comprising a heating pad attached to the at least one frame leg, at least one temperature sensor communicatively coupled with a temperature controller, and a power supply communicatively coupled with the heating pad and the temperature controller, wherein the temperature controller receives temperature signals from the at least one temperature sensor and provides instructions to the power supply to increase, decrease, or maintain an electrical current provided to the heating pad.

24. The bell positioning apparatus of claim 23, wherein the frame leg dimensional stability apparatus is configured to maintain a deflection $\delta$ of the bell to less than 200 microns over a time period of 4 hours, wherein:

$$\delta=(\Delta T*L*CTE_L)*h/W;$$

$\Delta T$ is a temperature variation across a width of the at least one frame leg over a time period of 4 hours when the at least one frame leg is a single frame leg or a temperature variation between two frame legs over a time period of 4 hours when the at least one frame leg is more than one frame leg;
L is a length of the at least one frame leg;
$CTE_L$ is the coefficient of thermal expansion of the at least one frame leg;
h is a length of the support from a top of the platform to a bottom edge of the bell; and
W is the width of the at least one frame leg when the at least one frame leg is a single frame leg or a distance between two frame legs when the at least one frame leg is more than one frame leg.

* * * * *

UNITED STATES PATENT AND TRADEMARK OFFICE
CERTIFICATE OF CORRECTION

| | | |
|---|---|---|
| PATENT NO. | : 10,399,883 B2 | Page 1 of 1 |
| APPLICATION NO. | : 15/402058 | |
| DATED | : September 3, 2019 | |
| INVENTOR(S) | : Adam Charles Berkey et al. | |

It is certified that error appears in the above-identified patent and that said Letters Patent is hereby corrected as shown below:

In the Specification

In Column 13, Line 2, change "distant" to --distance--

Signed and Sealed this
Twenty-first Day of January, 2020

Andrei Iancu
*Director of the United States Patent and Trademark Office*